US007887002B2

(12) United States Patent
Clark

(10) Patent No.: US 7,887,002 B2
(45) Date of Patent: Feb. 15, 2011

(54) CABLE STORAGE APPARATUS AND METHOD

(75) Inventor: Jessica Woods Clark, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 1058 days.

(21) Appl. No.: 11/368,892

(22) Filed: Mar. 6, 2006

(65) Prior Publication Data

US 2006/0144987 A1 Jul. 6, 2006

Related U.S. Application Data

(62) Division of application No. 10/393,691, filed on Mar. 20, 2003, now abandoned.

(51) Int. Cl.
*B65H 75/44* (2006.01)

(52) U.S. Cl. .................. 242/400.1; 242/404; 242/404.2

(58) Field of Classification Search .............. 242/400.1, 242/404, 404.2
See application file for complete search history.

(56) References Cited

U.S. PATENT DOCUMENTS

| | | | | |
|---|---|---|---|---|
| 4,101,089 | A | | 7/1978 | Culbertson et al. |
| 5,033,474 | A | | 7/1991 | Varelis et al. |
| 5,485,973 | A | | 1/1996 | Nellessen, Jr. |
| 5,513,816 | A | * | 5/1996 | Grubb ........................ 242/398 |
| 5,992,788 | A | | 11/1999 | Glass |
| 6,059,213 | A | | 5/2000 | Phillips |
| 6,135,810 | A | | 10/2000 | Damson et al. |
| 6,408,124 | B1 | | 6/2002 | Holman et al. |
| 6,554,218 | B2 | | 4/2003 | Buyce et al. |
| 6,814,328 | B1 | | 11/2004 | Li et al. |
| 6,942,173 | B1 | * | 9/2005 | Abramov ................ 242/400.1 |
| 2002/0044071 | A1 | | 4/2002 | Ding-Yuu |
| 2002/0057552 | A1 | | 5/2002 | Dinkin |
| 2004/0035972 | A1 | | 2/2004 | Glass |

* cited by examiner

*Primary Examiner*—Sang Kim
(74) *Attorney, Agent, or Firm*—Haynes and Boone, LLP

(57) ABSTRACT

A cable storage apparatus includes a standalone keyboard chassis having a first side and a second side opposite the first side; a plurality of keys on the first side; a recessed area defined by the second side; and a cable support mounted in the recessed area and separated from the keys by the second side of the keyboard member, whereby a keyboard cable is stored in the chassis, the cable support having a first portion for wrapping a cable and a second portion for retaining the cable on the first portion, the second portion being removable from the first portion.

11 Claims, 4 Drawing Sheets

12 36 38 28 W H L 26 30 40

38 42 46 32 44 36 W H L 26 34

CABLE STORAGE APPARATUS AND METHOD

CROSS-REFERENCE TO RELATED APPLICATIONS

This application claims priority to and is a divisional of co-owned, co-pending U.S. patent application Ser. No. 10/393,691, filed Mar. 20, 2003, by Jessica Woods Clark, entitled CABLE STORAGE APPARATUS AND METHOD, which is incorporated herein by reference in its entirety.

BACKGROUND

The present disclosure relates generally to computer systems, and more particularly to a cable storage for a keyboard cable.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Shipping products from suppliers to assemblers and from assemblers to consumers involves freight costs and material (packaging) costs. Reducing the volume of a shipping container can save on each of these costs.

The reduction of volume of a shipping container has inherent limitations due to the dimensions of the part being shipped. However, there is often available void space within the dimensions of the part where items can be stored. For example, when a keyboard is shipped, the attached cable or cord is coiled externally of the keyboard. The shipping container allows extra space for the cable.

Therefore, what is needed is a means for utilizing void space within the dimensions of the keyboard for storing the cord, thus enabling the reduction of volume of the keyboard shipping container.

SUMMARY

One embodiment, accordingly, provides a cable storage apparatus including a standalone keyboard chassis having a first side and a second side opposite the first side; a plurality of keys on the first side; a recessed area defined by the second side; and a cable support mounted in the recessed area and separated from the keys by the second side of the keyboard member, whereby a keyboard cable is stored in the chassis, the cable support having a first portion for wrapping a cable and a second portion for retaining the cable on the first portion, the second portion being removable from the first portion.

A principal advantage of this embodiment is that the shipping package volume can be reduced to substantially the same dimensions of the keyboard.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
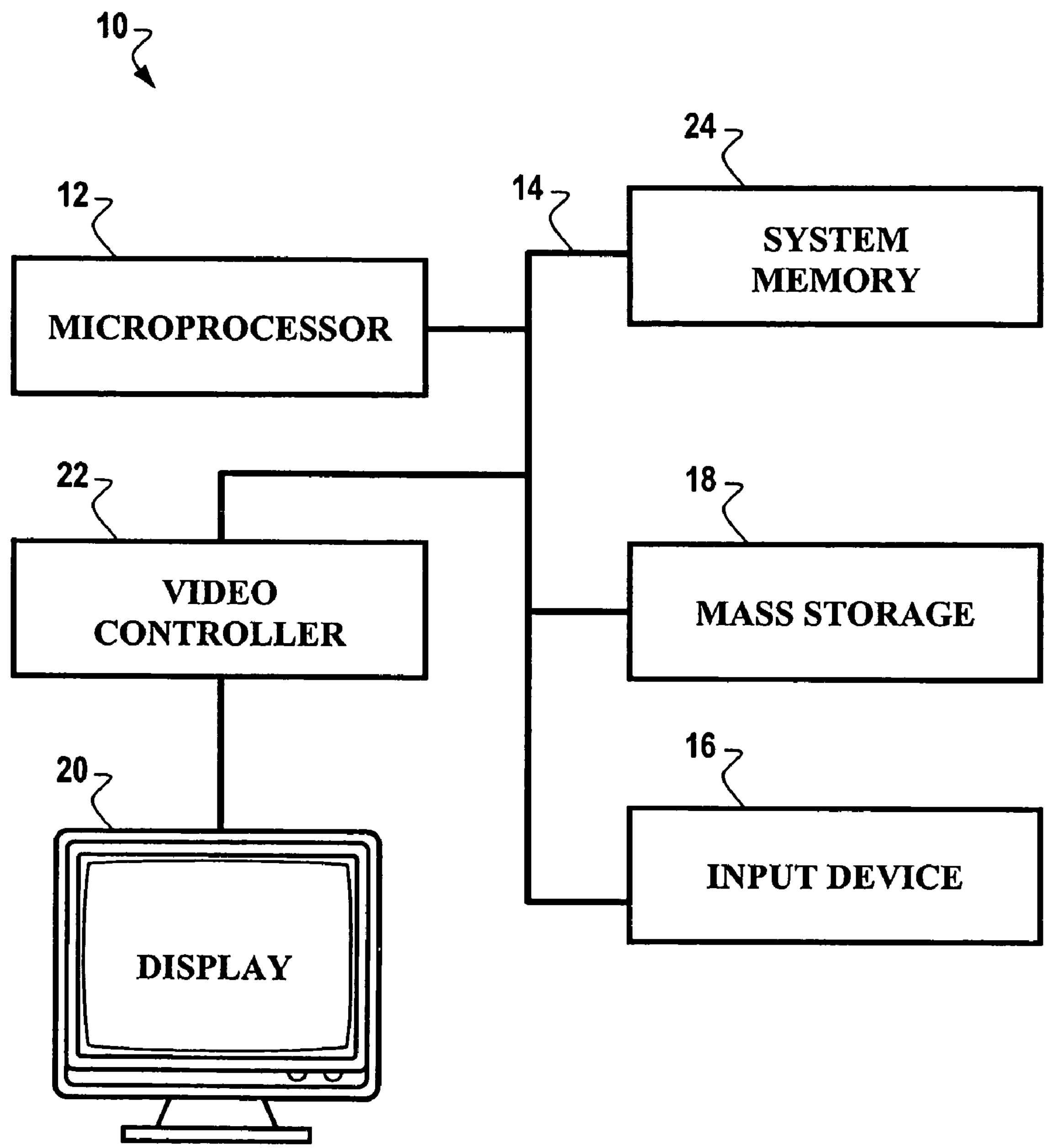
FIG. 1 is a diagrammatic view illustrating an embodiment of an information handling system.

In one embodiment, information handling system 10, which may be a computer system, FIG. 1, includes a microprocessor 12, which is connected to a bus 14. Bus 14 serves as a connection between microprocessor 12 and other components of computer system 10. An input device 16 is coupled to microprocessor 12 to provide input to microprocessor 12. Examples of input devices include keyboards, touchscreens, and pointing devices such as mouses, trackballs and trackpads. Programs and data are stored on a mass storage device 18, which is coupled to microprocessor 12. Mass storage devices include such devices as hard disks, optical disks, magneto-optical drives, floppy drives and the like. Computer system 10 further includes a display 20, which is coupled to microprocessor 12 by a video controller 22. A system memory 24 is coupled to microprocessor 12 to provide the microprocessor with fast storage to facilitate execution of computer programs by microprocessor 12. It should be understood that other busses and intermediate circuits can be deployed between the components described above and microprocessor 12 to facilitate interconnection between the components and the microprocessor.

Figure 2:
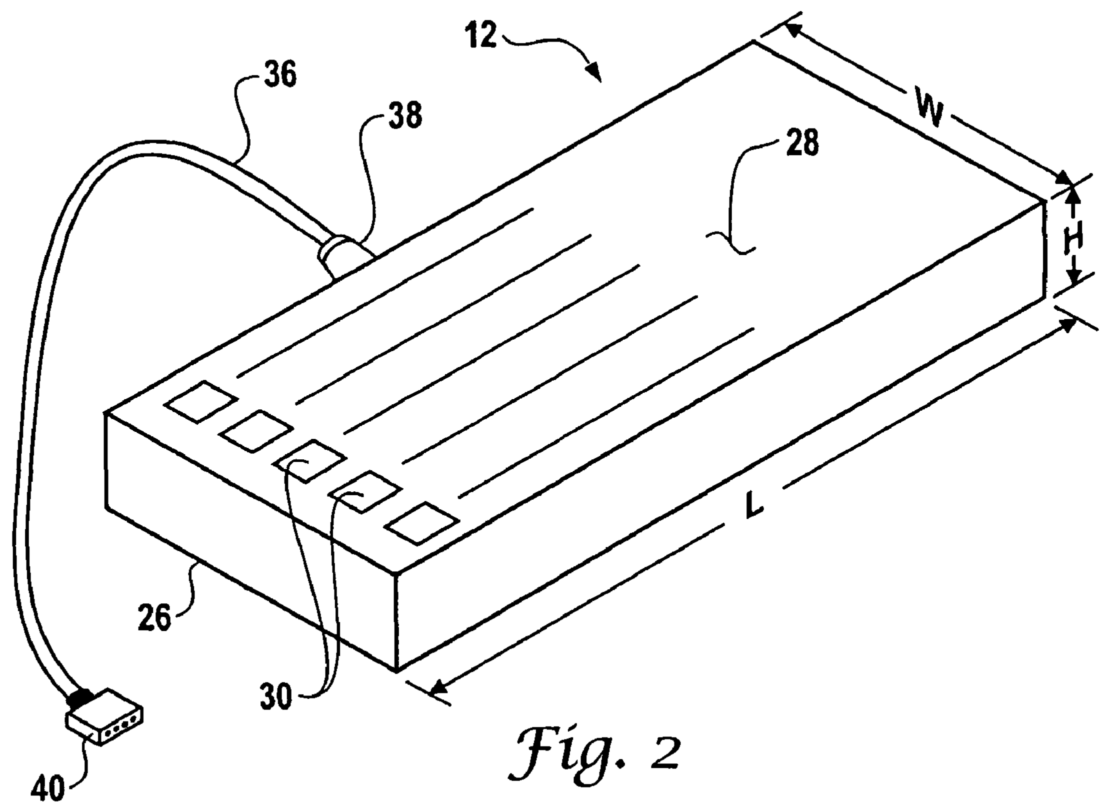
FIG. 2 is a perspective view illustrating an embodiment of a keyboard including keys on a first side of the keyboard.
Figure 3:
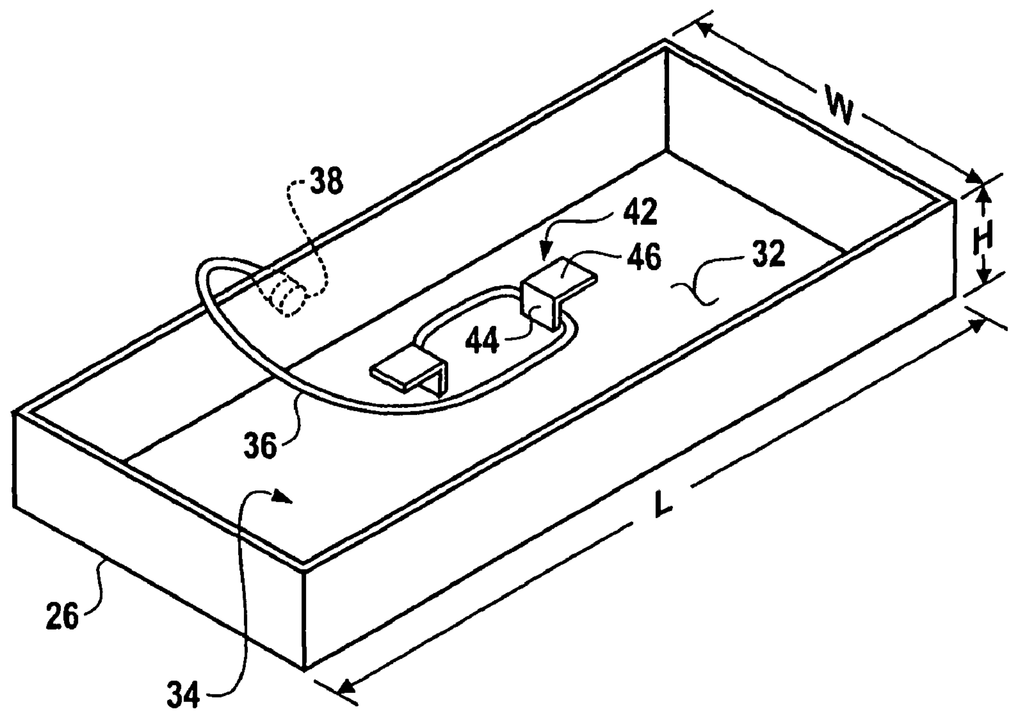
FIG. 3 is a perspective view illustrating an embodiment of an underside of the keyboard opposite the keys.

Input device 12, FIG. 2, includes a keyboard member 26 having a first side 28 including a plurality of keys 30, and having a second side 32, FIG. 3, defining a void area 34 within the dimensions L-W-H of the keyboard member 26. A cable

36, FIGS. 2 and 3, is fixedly attached at a first end 38 and includes a free end 40. Cable 36 may be wrapped on a cable support 42 mounted in the void area 34 and thereby confined within the dimensions L-W-H of the keyboard member 26.

The cable support 42 includes a first portion 44 and a second portion 46. The first portion 44 may be formed on the second side 32 within the void area 34, and the second portion 46 may then be removably mounted on the first portion 44. Alternatively, the cable support 42 may be formed such that the first and second portions 44, 46, respectively, are attached as a unit to the second side 32.

Figure 4:
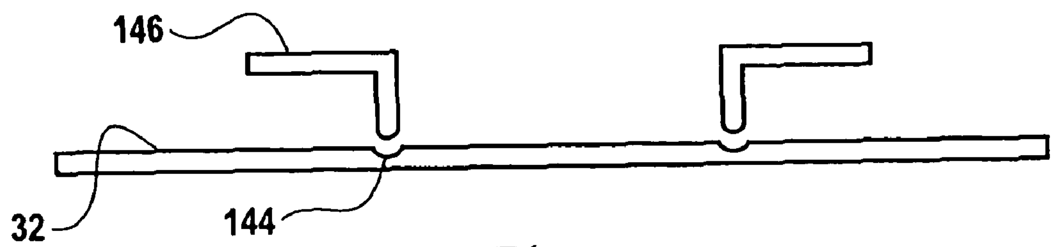
FIGS. 4-11 illustrate various embodiments of a cable support which can be removably mounted on the underside of the keyboard.

In one embodiment, FIG. 4, the first portion is a snap-in receiver 144 recessed into the second side 32. The second portion is an L-shaped arm 146 which is snapped into the recessed receiver 144.

Figure 5:
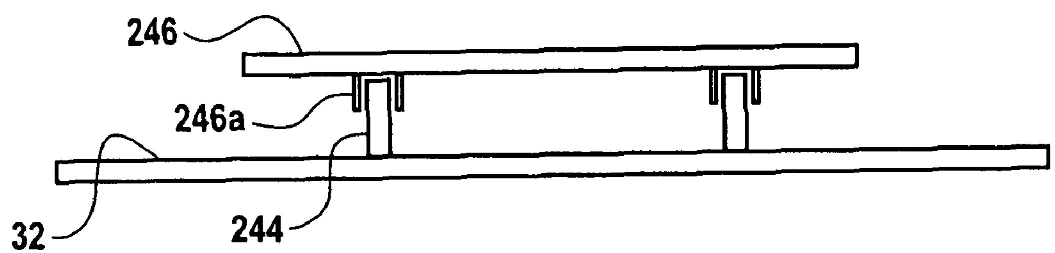

In one embodiment, FIG. 5, the first portion is a tab or tabs 244 extending from the second side 32. The second portion is an elongated bar 246 having one or more tab receivers **246*a* for a snap-on connection with respective tabs 244**.

Figure 6:
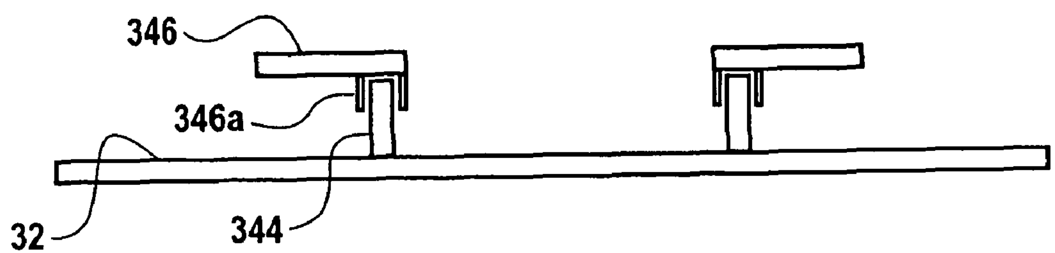

In one embodiment, FIG. 6, the first portion is a tab or tabs 344 extending from the second side 32. The second portion is an L-shaped arm 346 having a tab receiver **346*a* for a snap-on connection with a respective tab 344**.

Figure 7:
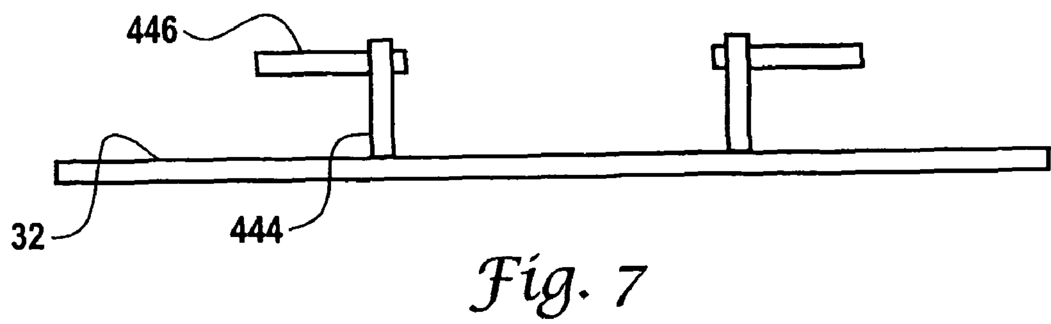

In one embodiment, FIG. 7, the first portion is a tab or tabs 444 extending from the second side 32. The second portion is a peg 446 extending through a respective tab 444.

Figure 8:
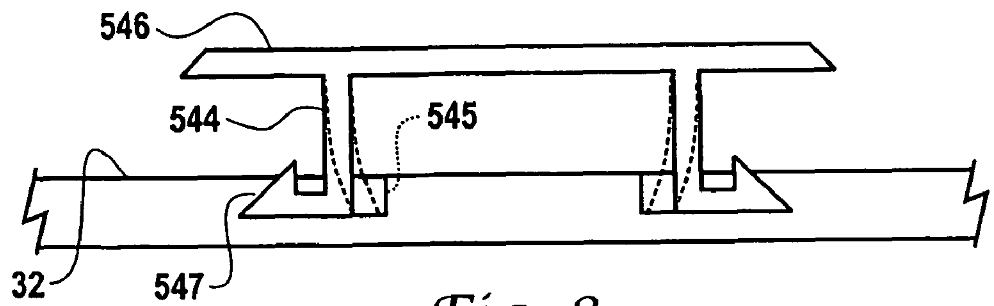

In FIG. 8 for example, a one-piece bar 546 may include tabs 544 which seat in a receptacle 545 formed in second side 32. A tapered surface 547 retains tabs 544 in receptacle 545, however, the tabs 544 are flexible so that they can be removed from their seating in receptacle 545, as shown by dotted lines.

Figure 9:
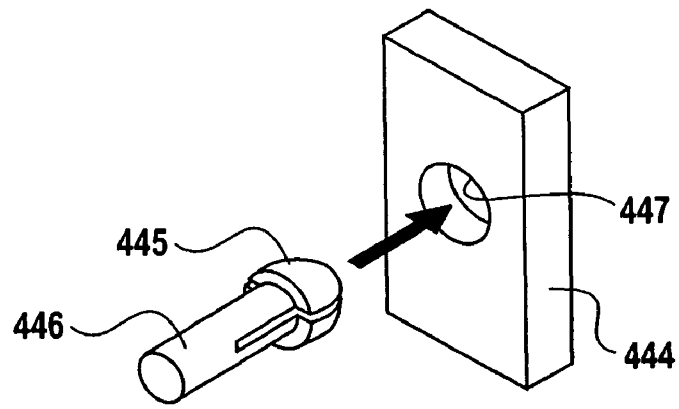

In FIG. 9 for example, the peg 446 may include a flexible split end 445 so that the peg 446 is easily snapped into a receiver 447 in tab 444, as is previously illustrated in FIG. 7.

Figure 10:
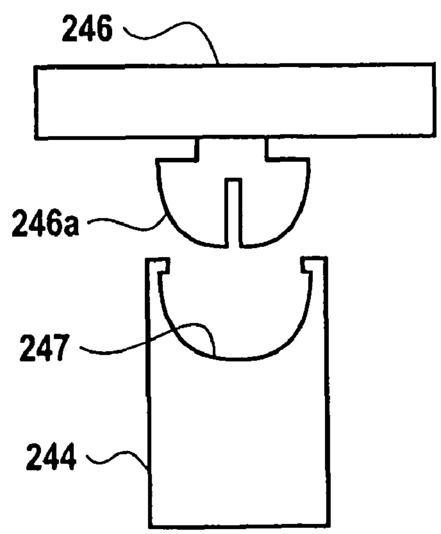
Figure 11:
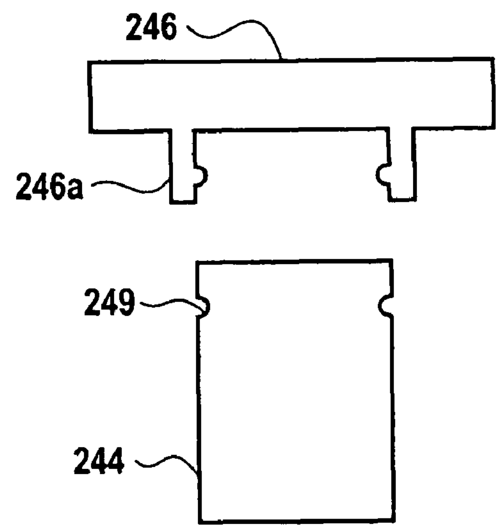

In FIG. 10 for example, the bar 246 of FIG. 5, may include flexible tab receiver **246*a* for seating into a seat 247 formed in tab 244, see also FIG. 7, as discussed above. Furthermore, in FIG. 11 for example, the bar 246 may alternatively include flexible tab receiver 246*a* for seating in detents 249 in tab 244**.

In operation, cable 36 is wrapped on the first portion 44 and retained on cable support 42 by the second portion 46. As such, the cable 36 is confined within the dimensions L-W-H of the keyboard member 26.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A cable storage apparatus comprising:

a standalone keyboard chassis having a first side and a second side opposite the first side;

a plurality of keys on the first side;

a recessed area defined by the second side;

a cable support mounted in the recessed area and separated from the keys by the second side of the standalone keyboard chassis, whereby a keyboard cable is stored in the standalone keyboard chassis, the cable support having a first portion for wrapping the keyboard cable and a second portion connected to the first portion for retaining the keyboard cable on the first portion;

a receptacle formed in the second side of the standalone keyboard chassis; and the first portion including a flexible tab removably mounted in the receptacle.

2. The apparatus as defined in claim 1 wherein the second portion is mounted on the first portion.

3. The apparatus as defined in claim 2 wherein the first portion includes a pair of members.

4. The apparatus as defined in claim 1 wherein the second portion is an elongated bar mounted on the first portion.

5. The apparatus as defined in claim 1 wherein the second portion is an arm mounted on the first portion.

6. An information handling system comprising:

a chassis;

a microprocessor mounted in the chassis;

a storage coupled to the microprocessor;

a separate keyboard chassis coupled to provide input to the microprocessor, the separate keyboard chassis having a first side and a second side opposite the first side;

a plurality of keys on the first side;

a recessed area defined by the second side;

a cable support mounted in the recessed area and separated from the keys by the second side of the separate keyboard chassis, whereby a keyboard cable is stored in the separate keyboard chassis, the cable support having a first portion for wrapping the keyboard cable and a second portion connected to the first portion for retaining the keyboard cable on the first portion;

a receptacle formed in the second side of the standalone keyboard chassis; and the first portion including a flexible tab removably mounted in the receptacle.

7. A method of storing a cable comprising:

providing a standalone keyboard chassis having a first side and a second side opposite the first side;

mounting a plurality of keys on the first side;

providing a recessed area defined by the second side;

mounting a cable support in the recessed area, the cable support being separated from the keys by the second side of the standalone keyboard chassis, whereby a keyboard cable is stored in the standalone keyboard chassis, the cable support having a first portion for wrapping the keyboard cable and a second portion connected to the first portion for retaining the keyboard cable on the first portion;

providing a receptacle in the second side of the standalone keyboard chassis; and providing the first portion with a flexible tab removably mounted in the receptacle.

8. The method as defined in claim 7 wherein the second portion is mounted on the first portion.

9. The method as defined in claim 8 wherein the first portion has a snap fit with the receptacle.

10. The method as defined in claim 7 wherein the second portion is an elongated bar mounted on the first portion.

11. The method as defined in claim 7 wherein the second portion is an arm mounted on the first portion.

* * * * *